United States Patent
Fox et al.

(10) Patent No.: US 12,498,176 B2
(45) Date of Patent: Dec. 16, 2025

(54) COOLING APPARATUS AND METHOD

(71) Applicant: SPHERE TECHNOLOGIES LTD, Yeruham (IL)

(72) Inventors: Aryeh Mordechai Fox, Yeruham (IL); Yair Suued, Yeruham (IL)

(73) Assignee: SPHERE TECHNOLOGIES LTD, Yeruham (IL)

( * ) Notice: Subject to any disclaimer, the term of this patent is extended or adjusted under 35 U.S.C. 154(b) by 332 days.

(21) Appl. No.: 18/033,615

(22) PCT Filed: Oct. 24, 2021

(86) PCT No.: PCT/IL2021/051255
§ 371 (c)(1),
(2) Date: Apr. 25, 2023

(87) PCT Pub. No.: WO2022/085008
PCT Pub. Date: Apr. 28, 2022

(65) Prior Publication Data
US 2024/0019214 A1    Jan. 18, 2024

(30) Foreign Application Priority Data

Oct. 25, 2020 (IL) .......................................... 278288

(51) Int. Cl.
*F28C 1/16* (2006.01)
*F28C 1/14* (2006.01)

(52) U.S. Cl.
CPC . *F28C 1/16* (2013.01); *F28C 1/14* (2013.01)

(58) Field of Classification Search
CPC ...... F28B 5/00; F28D 7/16; F28C 1/14; F28C 1/16; F28F 2250/08; F28F 25/06
See application file for complete search history.

(56) References Cited

U.S. PATENT DOCUMENTS

| | | | |
|---|---|---|---|
| 4,252,752 A | 2/1981 | Flandroy | |
| 9,057,563 B2 | 6/2015 | Carter et al. | |
| 10,809,006 B1 | 10/2020 | Shah | |
| 10,941,961 B2* | 3/2021 | Mislak | F24F 13/222 |
| 12,018,894 B2* | 6/2024 | Li | F28D 5/00 |
| 2007/0151278 A1* | 7/2007 | Jarvis | F24F 1/0007 |
| | | | 62/310 |
| 2013/0333407 A1* | 12/2013 | Jarvis | F28C 3/08 |
| | | | 62/314 |
| 2018/0030181 A1* | 2/2018 | Emoto | C07C 2/32 |
| 2020/0191506 A1 | 6/2020 | Landreth et al. | |

FOREIGN PATENT DOCUMENTS

CN    106152825 A    11/2016

OTHER PUBLICATIONS

PCT International Search Report for International Application No. PCT/IL2021/051255, mailed Jan. 25, 2022, 3pp.
PCT Written Opinion for International Application No. PCT/IL2021/051255, mailed Jan. 25, 2022, 7pp.

* cited by examiner

*Primary Examiner* — Christopher P Jones
(74) *Attorney, Agent, or Firm* — The Roy Gross Law Firm, LLC; Roy D. Gross

(57) ABSTRACT

An apparatus including: (a) a liquid conduit with sealable connectors at opposite ends thereof and air conduits passing vertically therethrough; (b) one or more mist generators positioned to deliver mist to said air conduits; and (c) an airflow generator positioned and configured to move said mist through said air conduits.

15 Claims, 7 Drawing Sheets

US 12,498,176 B2

COOLING APPARATUS AND METHOD

DETAILS OF RELATED APPLICATIONS

This application is a National Phase of PCT Patent application No. PCT/IL2021/051255 having International filing date of Oct. 24, 2021, which claims the benefit of priority under 35 U.S.C. § 119 (a) from Israeli application 278288 filed on 25 Oct. 2020; all of which are hereby incorporated by reference in their entirety.

FIELD OF THE INVENTION

The invention is in the field of heat exchangers.

BACKGROUND OF THE INVENTION

Cooling towers are often used in industry to help cool equipment and spaces. Cooling towers are more efficient than air-cooled systems and thus require less energy to achieve the same degree of cooling, but they also utilize significant amounts of fresh water. Additionally, scale build-up in such systems can be a problem, since this reduces the efficiency of heat transfer, resulting in greater requirements for electricity. The "harder" the water, (i.e. the higher the concentration of calcium, magnesium and other minerals in the water) the more scale builds up. Scale build-up can necessitate shutting down the system to enable physical removal of the scale and/or require the use of chemicals to inhibit, reduce or remove scale build-up. Chemical treatments to remove scale often contribute to environmental pollution, e.g. if phosphorus is employed.

SUMMARY OF THE INVENTION

A broad aspect of the invention relates cooling systems that are more efficient than air-cooled systems, but which use less water than traditional cooling towers.

One aspect of some embodiments of the invention relates to an apparatus that includes mist generators that add mist droplets to air airflow contacting walls of a liquid conduit conducting a flow of heated liquid. In some exemplary embodiments of the invention, the airflow passes through tubes transecting the liquid conduit. In some exemplary embodiments of the invention, the airflow passes through spaces between plate-like structures of the liquid conduit. In some exemplary embodiments of the invention, airflow is generated by a fan. In some exemplary embodiments of the invention, the airflow and the heated liquid have counter-current and/or crosscurrent flow directions. Alternatively or additionally, in some embodiments the liquid conduit has internal baffles. In some embodiments, baffles contribute to an increase in a length of a flow path and/or residence time of the heated liquid in the conduit. Some exemplary embodiments of the invention, reduce the amount of water that needs to be circulated in the system for every unit of heat rejected. This reduction contributes to a reduction in size and/or electricity consumption and/or maintenance requirements.

It will be appreciated that the various aspects described above relate to solution of technical problems associated with reducing consumption of cooling water.

Alternatively or additionally, it will be appreciated that the various aspects described above relate to solution of technical problems related to increasing the amount of heat absorbed by each unit of water in a cooling system.

In some exemplary embodiments of the invention there is provided an apparatus including: (a) a liquid conduit with sealable connectors at opposite ends thereof and air conduits passing vertically therethrough; (b) one or more mist generators positioned to deliver mist to the air conduits; and (c) an airflow generator positioned and configured to move the mist through the air conduits. In some embodiments, the apparatus includes baffles in the liquid conduit. Alternatively or additionally, in some embodiments the airflow generator includes a fan. Alternatively or additionally, in some embodiments the liquid conduit includes a plurality of compartments in fluid communication with one another and spaces between the compartments serve as the air conduits. Alternatively or additionally, in some embodiments the liquid conduit includes a single compartment and tubes traversing the compartment serve as the air conduits. Alternatively or additionally, in some embodiments the apparatus is deployed in a water chiller system. Alternatively or additionally, in some embodiments the apparatus is deployed in an air conditioning system. Alternatively or additionally, in some embodiments the apparatus is connected via one of the connectors to a power plant turbine. Alternatively or additionally, in some embodiments the apparatus has a cooling water requirement of ≤5 L/kW of removed heat energy.

In some exemplary embodiments of the invention there is provided a method comprising: (a) directing a flow of heated liquid through a conduit with a wall; and (b) contacting an airflow carrying mist droplets with the wall. In some embodiments, flow of heated liquid and the airflow carrying mist droplets comprise counter-current flows. Alternatively or additionally, in some embodiments the flow of heated liquid and the airflow carrying mist droplets comprise cross-current flows. Alternatively or additionally, in some embodiments the mist droplets have a size range of 10 μm to 100 μm diameter. Alternatively or additionally, in some embodiments the mist droplets have a size range of 40 μm to 60 μm diameter. Alternatively or additionally, in some embodiments a population of the mist droplets carried by the airflow has an average size of 50 μm diameter. Alternatively or additionally, in some embodiments a volume of the mist droplets carried by the airflow is in the range of 1 L/min to 4 L/min. Alternatively or additionally, in some embodiments the method has a cooling water requirement of ≤5 L/kW of removed heat energy.

In some exemplary embodiments of the invention there is provided a heat exchanger characterized by: a heat transfer coefficient of 500 w/m$^2$ $^k$ to 1000 w/m$^2$ $^k$; and a cooling water requirement of ≤5 L/kW of removed heat energy. In some embodiments, the heat exchanger is further characterized by a logarithmic mean temperature difference (LMTD) (k) of about 5.

In some exemplary embodiments of the invention there is provided an apparatus including a chamber configured for flow therethrough of a liquid to be cooled, the chamber having a fluid inlet located proximal a first end of the chamber, and a fluid outlet located distal to the first end near a second end of the chamber, the chamber being configured with a plurality of partitions directed along the length thereof between the first end and the second end, the partitions separating the interior of the chamber from the exterior of the chamber, the partitions defining interstices exterior to the chamber running in parallel through the chamber; an airflow generator located proximal to the first end, the airflow generator, when in operation, generating a flow of air in the direction of the second end through the interstices toward the first end; and a plurality of misters proximal to the second end, and arranged so that mist generated by the misters is carried into the interstices when the airflow generator is in operation. In some embodiments, the partitions are of cylindrical shape with openings defined in a first end wall located at the first end and in a second end wall located at the second end, respectively, so that the interior of the cylinders is exterior to the chamber, and the chamber further comprises an outer wall extending between the first end wall and the second end wall, the outer wall together with the end walls enclosing the cylinders and defining the interior of the chamber. Alternatively or additionally, in some embodiments the chamber includes a plurality of sub chambers in fluid communication with one another, the sides of the sub-chambers constituting the partitions. Alternatively or additionally, in some embodiments each sub-chamber has a pair of major sidewalls, a pair of minor sidewalls and pair of end walls, the major sidewalls and the minor sidewalls forming the partitions. Alternatively or additionally, in some embodiments the chamber further comprises a plurality of baffles located in the interior of the chamber, the baffles being arranged to increase the length of the minimum flow path within the chamber of fluid flowing from the fluid inlet to the fluid outlet relative to the minimum flow path in the absence of the baffles. Alternatively or additionally, in some embodiments at least one sub-chamber comprises a plurality of baffles located in the interior of the sub-chamber, the baffles being arranged to increase the length of the minimum flow path within the sub-chamber of fluid flowing from the fluid inlet to the fluid outlet relative to the minimum flow path in the absence of the baffles. Alternatively or additionally, in some embodiments the misters produce droplets in a size range of 10 μm to 100 μm diameter. Alternatively or additionally, in some embodiments the misters produce droplets in a size range of 40 to 60 μm in diameter. Alternatively or additionally, in some embodiments the average size of the droplets is 50 μm as determined by volume. Alternatively or additionally, in some embodiments in operation each mister emits a volume of between about 0.05 and 0.5 liter water per minute. Alternatively or additionally, in some embodiments the apparatus is configured to mist a volume of water into the system in the range of 1 L/min to 4 L/min. Alternatively or additionally, in some embodiments the apparatus is configured to mist a volume of water into each of the interstices in the range of 0.05 L/Min to 0.200 L/min. Alternatively or additionally, in some embodiments the fluid inlet and fluid outlet are in fluid communication with (a) a compressor at the inlet and a throttle at the outlet (in a water chiller system, where a system of the present type may be used instead of a traditional condenser); (b) a compressor at the inlet and a throttle at the outlet (in a typical air conditioning system, where a system of the present type may be used instead of a traditional condenser); (c) a power plant turbine at the inlet and a pump at the outlet (in a power plant, where a system of the present type may be used instead of traditional condenser); or (d) the cooling system of a liquid cooled server room.

In some exemplary embodiments of the invention there is provided a method of cooling a liquid including causing the liquid to flow from an inlet proximal to a first end of a chamber toward an outlet proximal to a second end of the chamber distal to the first end, the chamber being configured with a plurality of partitions directed along the length thereof between the first end and the second end, the partitions separating the interior of the chamber from the exterior of the chamber, the partitions defining interstices exterior to the chamber running in parallel through the chamber; generating a flow of air in the direction of the second end through the interstices toward the first end; and proximal to the second end, generating a mist that is carried by the flow of air into the interstices. In some embodiments, the partitions are of cylindrical shape with openings defined in a first end wall located at the first end and in a second end wall located at the second end, respectively, so that the interior of the cylinders is exterior to the chamber, and the chamber further comprises an outer wall extending between the first end wall and the second end wall, the outer wall together with the end walls enclosing the cylinders and defining the interior of the chamber. Alternatively or additionally, in some embodiments the chamber includes a plurality of sub-chambers in fluid communication with one another, the sides of the sub-chambers constituting the partitions. Alternatively or additionally, in some embodiments each sub-chamber has a pair of major sidewalls, a pair of minor sidewall and pair of end walls, the major sidewalls and the minor sidewalls forming the partitions. Alternatively or additionally, in some embodiments the chamber further includes a plurality of baffles located in the interior of the chamber, the baffles being arranged to increase the length of the minimum flow path within the chamber of fluid flowing from the fluid inlet to the fluid outlet relative to the minimum flow path in the absence of the baffles. Alternatively or additionally, in some embodiments at least one sub-chamber includes a plurality of baffles located in the interior of the sub-chamber, the baffles being arranged to increase the length of the minimum flow path within the sub-chamber of fluid flowing from the fluid inlet to the fluid outlet relative to the minimum flow path in the absence of the baffles. Alternatively or additionally, in some embodiments the droplets are produced in a size range of 10 μm to 100 μm diameter. Alternatively or additionally, in some embodiments the droplets are produced in a size range of 40 μm to 60 μm diameter. Alternatively or additionally, in some embodiments the average size of the droplets is 50 μm diameter as determined by volume. Alternatively or additionally, in some embodiments each mister emits a volume of between about 0.05 L/min and 0.5 L/min water. Alternatively or additionally, in some embodiments the misters mist a volume of water into the system in the range of 1 L/min to 4 L/min. Alternatively or additionally, in some embodiments the volume of water misted into each of the interstices in the range of L/min to 0.2 L/min. Alternatively or additionally, in some embodiments the water in the mist includes tap water and/or deionized water and/or distilled water. Alternatively or additionally, in some embodiments the liquid to be cooled enters the chamber at a temperature in the range of 20° C. to 90° C. Alternatively or additionally, in some embodiments the liquid to be cooled enters the chamber at a temperature in the range of 35° C. to 60° C. Alternatively or additionally, in some embodiments the ambient air temperature is up to 40° C. Alternatively or additionally, in some embodiments the ambient air temperature is up to 35° C. Alternatively or additionally, in some embodiments the ambient air temperature is up to 30° C. Alternatively or additionally, in some embodiments the ambient air temperature is up to 25° C. Alternatively or additionally, in some embodiments the ambient air temperature is up to 20° C.

Unless otherwise defined, all technical and scientific terms used herein have the same meaning as commonly understood by one of ordinary skill in the art to which this invention belongs. Although suitable methods and materials are described below, methods and materials similar or equivalent to those described herein can be used in the practice of the present invention. In case of conflict, the patent specification, including definitions, will control. All materials, methods, and examples are illustrative only and are not intended to be limiting.

As used herein, the terms "comprising" and "including" or grammatical variants thereof are to be taken as specifying inclusion of the stated features, integers, actions or components without precluding the addition of one or more additional features, integers, actions, components or groups thereof. This term is broader than, and includes the terms "consisting of" and "consisting essentially of" as defined by the Manual of Patent Examination Procedure of the United States Patent and Trademark Office. Thus, any recitation that an embodiment "includes" or "comprises" a feature is a specific statement that sub embodiments "consist essentially of" and/or "consist of" the recited feature.

The phrase "consisting essentially of" or grammatical variants thereof when used herein are to be taken as specifying the stated features, integers, steps or components but do not preclude the addition of one or more additional features, integers, steps, components or groups thereof but only if the additional features, integers, steps, components or groups thereof do not materially alter the basic and novel characteristics of the claimed composition, device or method.

The phrase "adapted to" as used in this specification and the accompanying claims imposes additional structural limitations on a previously recited component.

The term "method" refers to manners, means, techniques and procedures for accomplishing a given task including, but not limited to, those manners, means, techniques and procedures either known to, or readily developed from known manners, means, techniques and procedures by practitioners of architecture and/or computer science.

Implementation of the method and system according to embodiments of the invention involves performing or completing selected tasks or steps manually, automatically, or a combination thereof. Moreover, according to actual instrumentation and equipment of exemplary embodiments of methods, apparatus and systems of the invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

For purposes of this specification and the accompanying claims, indication of droplet volume reflects information provided in the manufacturer's product specification for specific commercially available mist generating devices.

BRIEF DESCRIPTION OF THE DRAWINGS

In order to understand the invention and to see how it may be carried out in practice, embodiments will now be described, by way of non-limiting example only, with reference to the accompanying figures. In the figures, identical and similar structures, elements or parts thereof that appear in more than one figure are generally labeled with the same or similar references in the figures in which they appear. Dimensions of components and features shown in the figures are chosen primarily for convenience and clarity of presentation and are not necessarily to scale. The attached figures are.

DETAILED DESCRIPTION OF EMBODIMENTS

Figure 1:
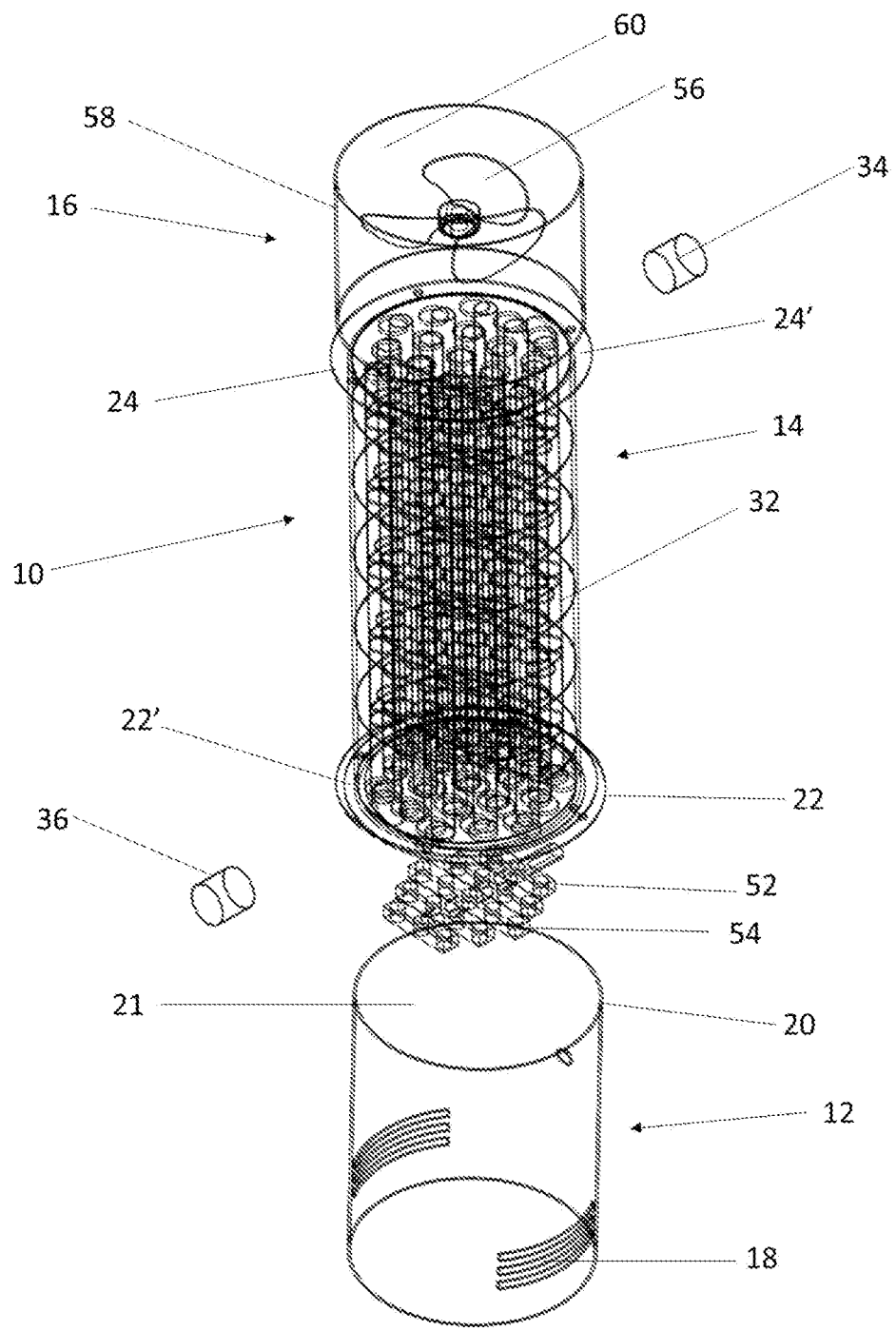
FIG. 1 is an exploded top perspective view of an apparatus according to an exemplary embodiment of the invention.
Figure 2:
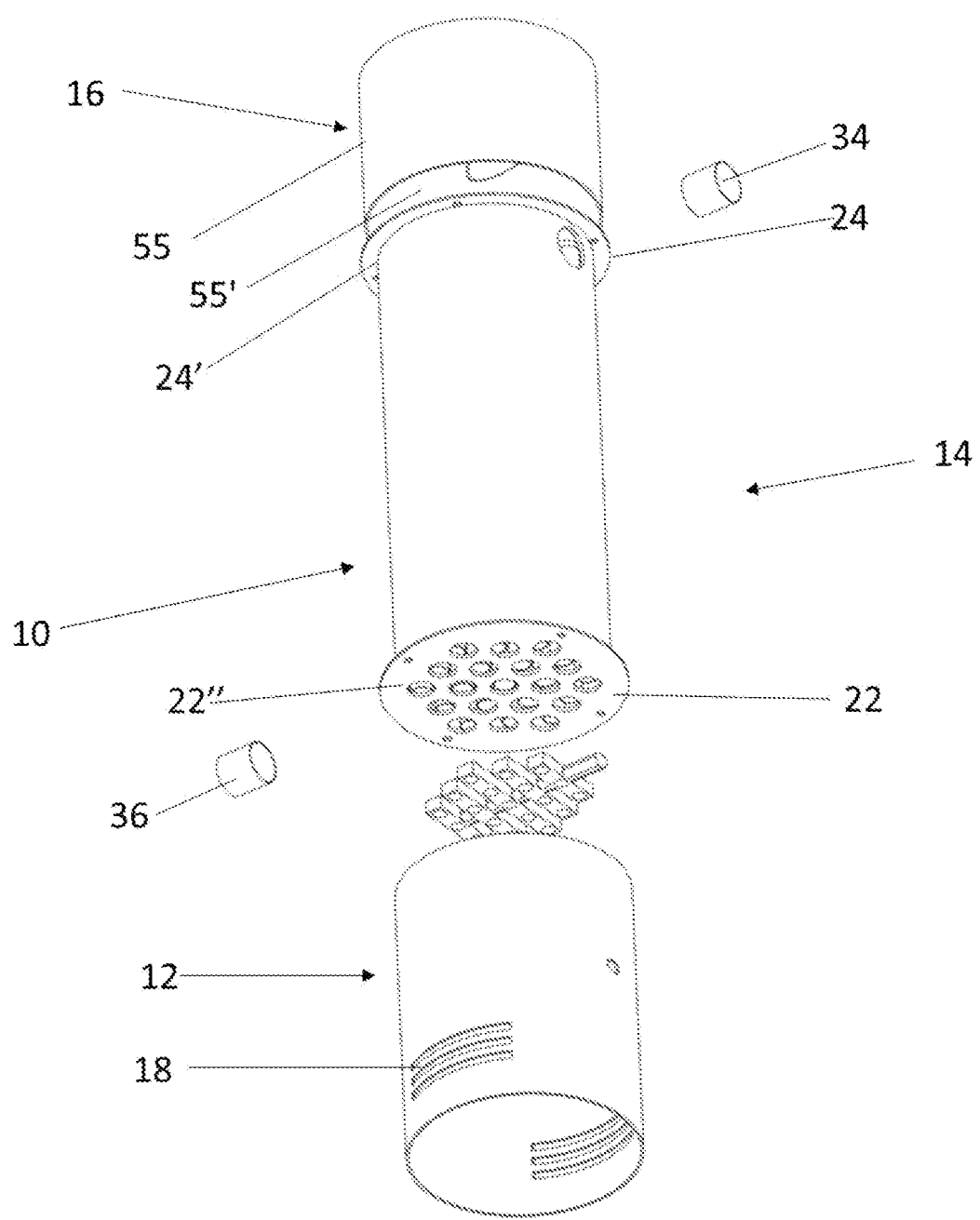
FIG. 2 is an exploded bottom perspective view of the same apparatus as in FIG. 1.
Figure 3:
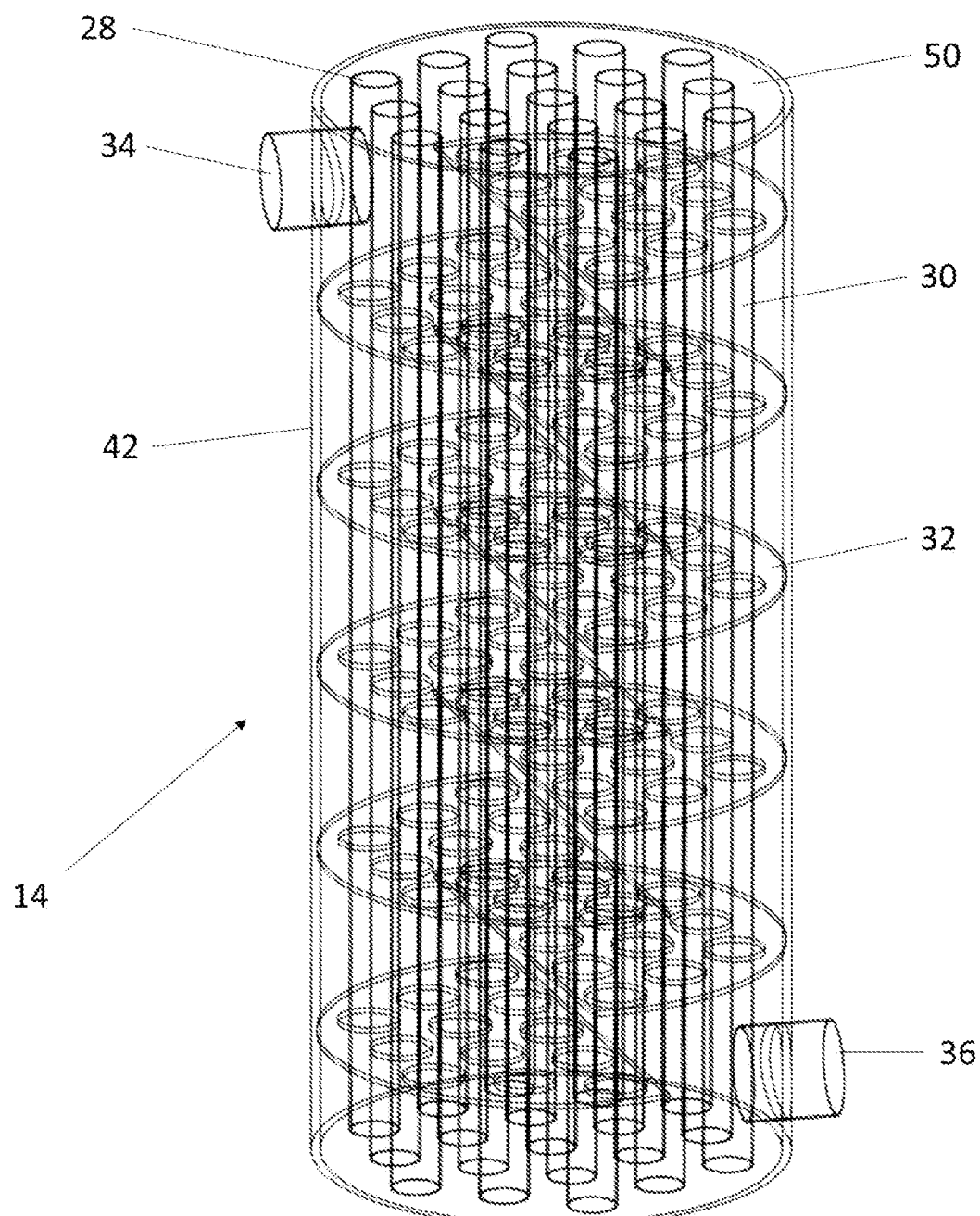
FIG. 3 is a perspective view from above of an assembled central portion of the apparatus depicted in FIG. 1.
Figure 4:
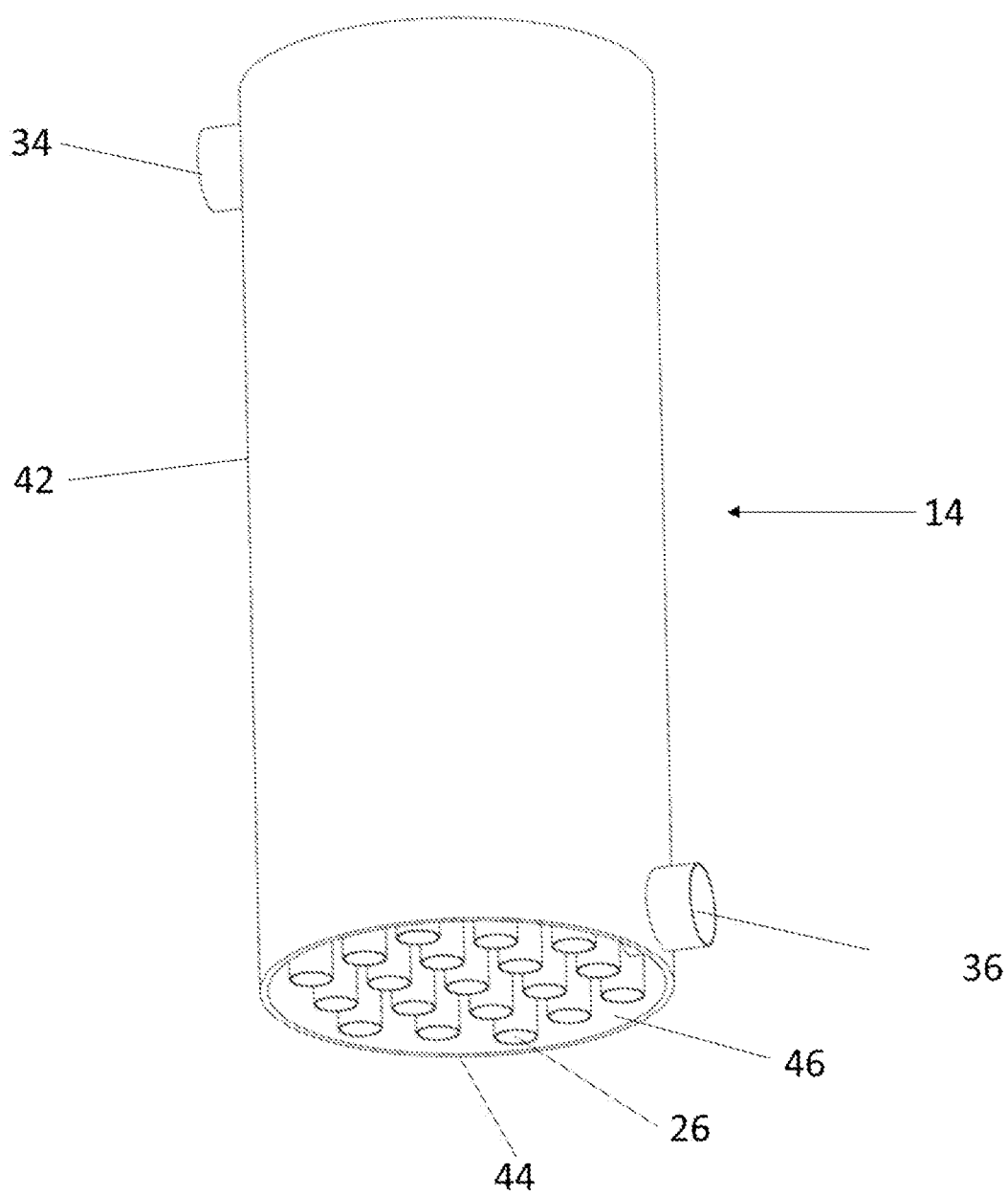
FIG. 4 is a perspective view from below of the assembled central portion of the apparatus depicted in FIG. 3.

Embodiments of the invention relate to apparatus and methods for heat exchange. Specifically, some embodiments of the invention can be used to cool a fluid flowing through an apparatus.

The principles and operation of an apparatus and/or method according to exemplary embodiments of the invention may be better understood with reference to the drawings and accompanying descriptions.

Before explaining at least one embodiment of the invention in detail, it is to be understood that the invention is not limited in its application to the details set forth in the following description or exemplified by the Examples. The invention is capable of other embodiments or of being practiced or carried out in various ways. Also, it is to be understood that the phraseology and terminology employed herein is for the purpose of description and should not be regarded as limiting.

As shown in FIG. 1, FIG. 2, FIG. 3, and FIG. 4, an exemplary cooling apparatus 10 comprises a lower portion 12, a central portion 14 and an upper portion 16. In the depicted embodiment, lower portion 12 is cylindrical and hollow, with a series of slits 18 near the bottom to allow the entry of air, and the upper rim 20 of lower portion 12 defines an aperture 21 at its top end. According to various exemplary embodiments of the invention a height of lower portion 12 above slits 18 ranges from 10 cm to 50 cm, or from 15-40 cm, and the inner diameter ranges from 20 to 30 cm. In some exemplary embodiments of the invention, lower portion 16 is formed from metal, such as aluminum. It is emphasized that the dimensions mentioned in connection with the drawings herein are given for illustrative purposes, for an apparatus with a cooling capacity of about 30 kilowatts/hour to 80 kilowatts/hour. According to various exemplary embodiments of the invention the dimensions are varied in accordance with the needs of the system in which the apparatus is to be employed.

In the depicted embodiment, central portion 14 includes a cylindrical portion 42 (see FIGS. 3 and 4), with rims 44 and 48 defining apertures 46 and 50 at the lower and upper ends thereof, respectively, and also includes lower and upper disks 22 and 24, respectively. As shown these disks are the same size, although in principle the disks may be different sizes, as long as lower disk 22 is sized to cover and seal apertures 21 and 46 and upper disk 24 is sized to cover and seal apertures 50 and 55'.

In the depicted embodiment, disks 22 and 24 have groups of holes 26 and 28 respectively formed therein. In the depicted embodiment, there are nineteen holes in each disk, although in practice this number varies. Regardless of the number of holes employed, the number of holes in each disk is the same. As shown in the figures, the holes all have the same diameter (e.g. about 2.5 cm). In other exemplary embodiments of the invention, hole diameters vary from about 1 cm to about 5 cm. In the depicted embodiment, holes 26 and 28 are aligned with each other, with aligned holes having the same diameter, and sealingly attached to upper surface 22' of disk 22 and the lower surface 24' of disk 24 around each of holes are a series of tubes 30. In some exemplary embodiments of the invention, tubes 30 are formed of a metal, for example a non-corrosive metal having heat conductivity over 100 watt/meter kelvin. Examples of metals with suitable heat conductivity include (but are not limited to) copper (>400 w/m k) and aluminum (>200 w/m k). It is also possible to use stainless steel (>10 w/m k) in some cases. In the depicted embodiment, each of tubes 30 has the same length. In some exemplary embodiments of the invention, a length of tubes 30 is from 50 cm to 150 cm. In some embodiments, a length of tubes 30 is about 100 cm. Alternatively or additionally, according to various exemplary embodiments of the invention an inner diameter of tubes 30 ranges from 1 cm to 5 cm, optionally about 2.5 cm, in accordance with the size of holes 26 and 28.

In the depicted embodiment, tubes 30 also run through a series of roughly semi-circular baffles 32, which are arranged at set distances from disk 22 and 24, and are oriented approximately perpendicularly to the axes of the tubes 30. As depicted, each baffle has 12 holes formed therein, and the baffles are oriented in alternating fashion, so that a middle set A of five tubes runs through all the baffles, whereas the remaining groups of 7 tubes, B and C, on each side of A run through alternating baffles. The baffles serve not only to help secure the tubes 30 in place, but also to direct the flow of a liquid to be cooled through the central portion, from inlet tube 34 down through outlet tube 36. In the depicted embodiment, inlet tube 34 and outlet tube 36 are mounted over apertures 38 and 40 respectively formed in cylinder 42 (not visible in FIGS. 1 and 6) which seals central portion 14 at disks 22 and 24. In some exemplary embodiments of the invention, this placement of the baffles improves the contact between the fluid and tubes 30 and/or increases residence time of the heated liquid within cylindrical portion 42 relative to an arrangement without the baffles. Improved contact and/or increased residence time contribute to improved cooling of the flowing liquid.

In the depicted embodiment, a group of misters 52 is positioned at the lower surface 22" of disk 22. In the depicted embodiment, each mister is aligned with one of the holes in disk 22. Commercially available examples of misters are the MicroWhirl, the P, and the PJ, available from BETE Fog Nozzle, Inc., Greenfield, Massachusetts, USA, www.bete.com. As depicted in the figures, the misters are held in place by a series of bars 54. In some exemplary embodiments of the invention, the bars are affixed to lower surface 22". In some embodiments, fixation of the bars is removable affixation. According to the depicted arrangement, mist from each mister 52 enters directly into a corresponding tube 30. In other exemplary embodiments of the invention, misters 52 are located at a distance from lower surface 22" (e.g. 15-40 cm from the holes, for example by affixation of bars 54 to the interior of lower portion 12, between slits 18 and lower surface 22"). Water is provided to the misters via a tube or conduit (not depicted).

According to various exemplary embodiments of the invention misters 52 produce droplets in a size range of about 10 µm to 100 µm, or in a range of 40 µm to 60 µm, with an average size of 50 µm as determined by volume. Alternatively or additionally, in some embodiments each mister emits a volume of between about 0.05 L and 0.5 L of water per minute. Although FIGS. 1, 6, 12 and 16 depict one mister 52 per tube 30, other arrangements are possible, for example in some exemplary embodiments one mister feeds 2 to 4 tubes simultaneously. In some embodiments, a volume of water misted into each tube 30 is in the range of 50 ml/min to 200 ml/min, and/or the volume of mist injected into the whole apparatus is in the range of 1000 ml/min to 4000 ml/min.

In the depicted embodiment, upper portion 16 is also cylindrical. In the depicted embodiment, upper portion 16 has the same inner diameter as cylinder 42, and is sealingly secured to the upper surface 24" of disk 24 along lower rim 55 of upper portion 16, which defines an aperture 55'. In the depicted embodiment, a fan 56 is mounted in upper portion 16, which in operation generates an air stream which pulls air through slits 18, past the misters 52, through tubes 30 and out through aperture 60 formed by the upper rim 58 of upper portion 16.

The exemplary apparatus shown in the figures is typically be used as part of a circulating liquid cooling system. In operation, a hot liquid, generally water, is introduced into central portion 14 via inlet tube 34. The hot liquid will be hot as a result of absorbing heat from a system to be cooled, for example a liquid cooled Data Center Rack, and will be pumped into the central portion by a pump (not shown). Fan 56 creates an upward draft, pulling air through slits 18 into lower portion 12 and up through tubes 30. Misters 52 create a mist, which is dispersed in the air pulled through the tubes 30. In the arrangement in which the misters are positioned a distance from the holes, partial evaporation of this mist as it rises prior to entering tubes 30 helps cool the air prior to entry into tubes. Evaporation of the mist as it rises through the tubes 30 further cools the air. Thus the air in the tubes will generally be cooler than air entering the slots 18, and upon entry into each tube will be cooler than the hot liquid passing through central portion 14. Additionally, water in the mist will also coat the inner surfaces of tubes 30 with which the mist comes into contact. As heat transfers from the hot liquid through the bodies of the tubes to the inner surfaces of the tubes, the water on the inner tube surfaces absorbs the heat and evaporates, being carried up in the stream of air running through the tube.

The presence of the baffles 32 helps ensure that hot liquid does not take a direct path from inlet 34 to outlet 36, or that some portions of the liquid moving through central portion 14 resides there for significantly longer than other portions of the liquid, but instead that the liquid traverses the outer surfaces of tubes 30 several times on its way to outlet 36. This improves both the overall flow, and improves the contact of the liquid with the outer surfaces of the rods, thus improving the overall heat transfer from the liquid to the air/water mixture passing through the rods.

The liquid exiting via outlet 36 is thus significantly cooler than the liquid entering via inlet 34. In some exemplary embodiments of the invention, the liquid exiting via outlet 36 is recycled directly back to the system to be cooled, where it will absorb heat and then be directed again through inlet 34. Alternatively, in some embodiments, more than one apparatus 10 is employed in series, to effect further cooling of the liquid to be cooled before recycling it back into the system. In some exemplary embodiments of the invention, two or more apparatus 10 are employed in parallel, to increase the overall throughput of liquid to be cooled.

The embodiment shown in the figures is contemplated for a system in which 90 liters of liquid to be cooled is circulated through central portion 16 per minute. It will be appreciated, however, that the apparatus may be adapted to cool larger or smaller volumes of liquid per unit time, for example by increasing the number of tubes 30 running from the lower portion to the upper portion, and/or increasing or decreasing the length of the tubes, and/or by changing the inner diameter of the tubes, or by a combination of such factors.

In some exemplary embodiments of the invention, the Reynolds number (Re) contributes to cooling. Based on studies and experimental data, a Re value >10000 provides good cooling. The principle of effective cooling in the system is establishing a stable thin film (10-100 micron) of water at the air/droplet side (i.e. inner surface of tubes 30 or outer surface of plates 130). The Volume of mist is used to replenish this film. If there are not enough droplets in the air flow, the film will break and heat conductivity will go down dramatically. High air temperature can contribute to acceleration of evaporation but has a negative effect on the temperature gradient. Water which evaporates from the film is lost to the environment and dissipates heat from the apparatus to the environment.

Figure 5:
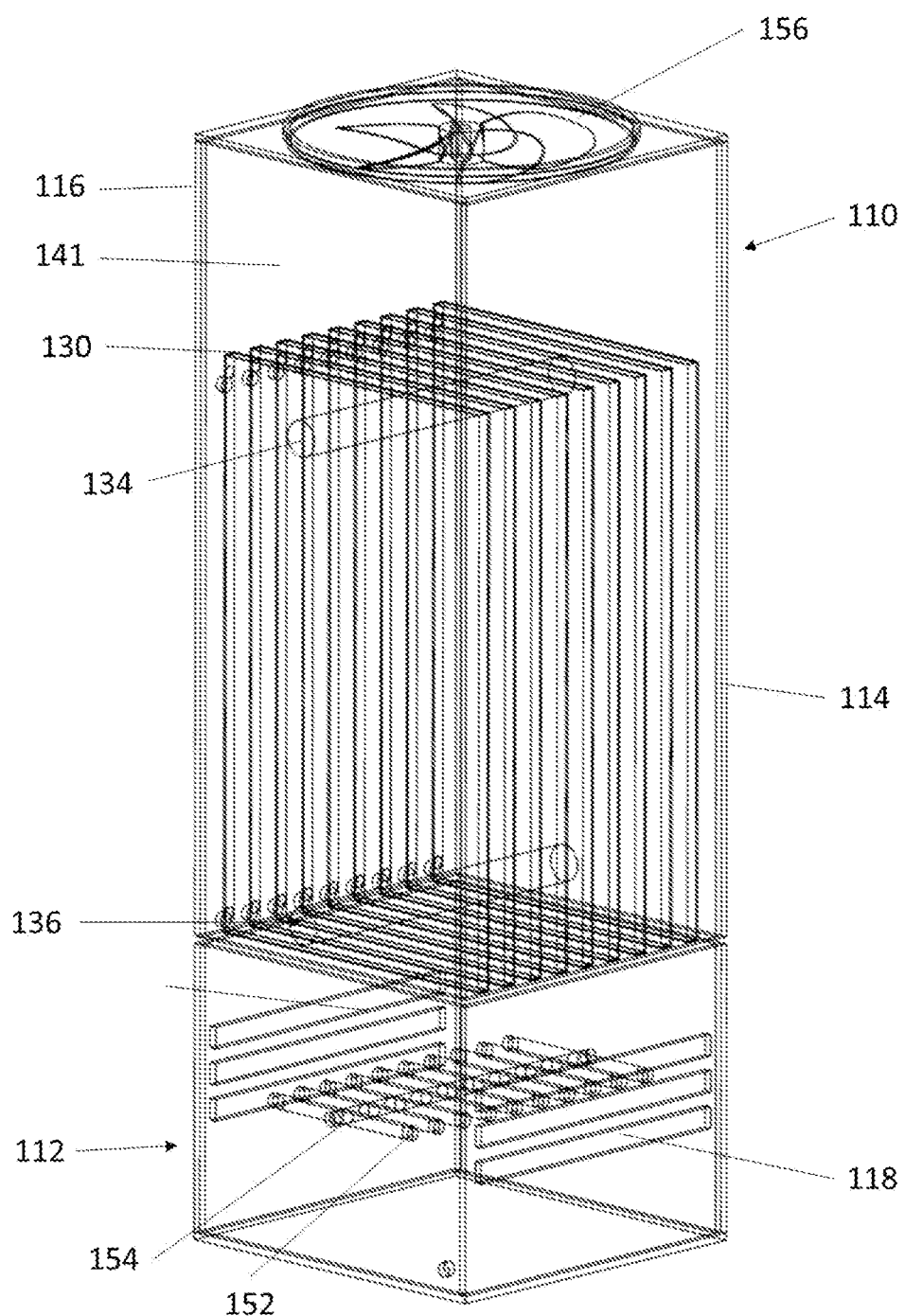
FIG. 5 is a top perspective view of an apparatus according to another exemplary embodiment of the invention.
Figure 6:
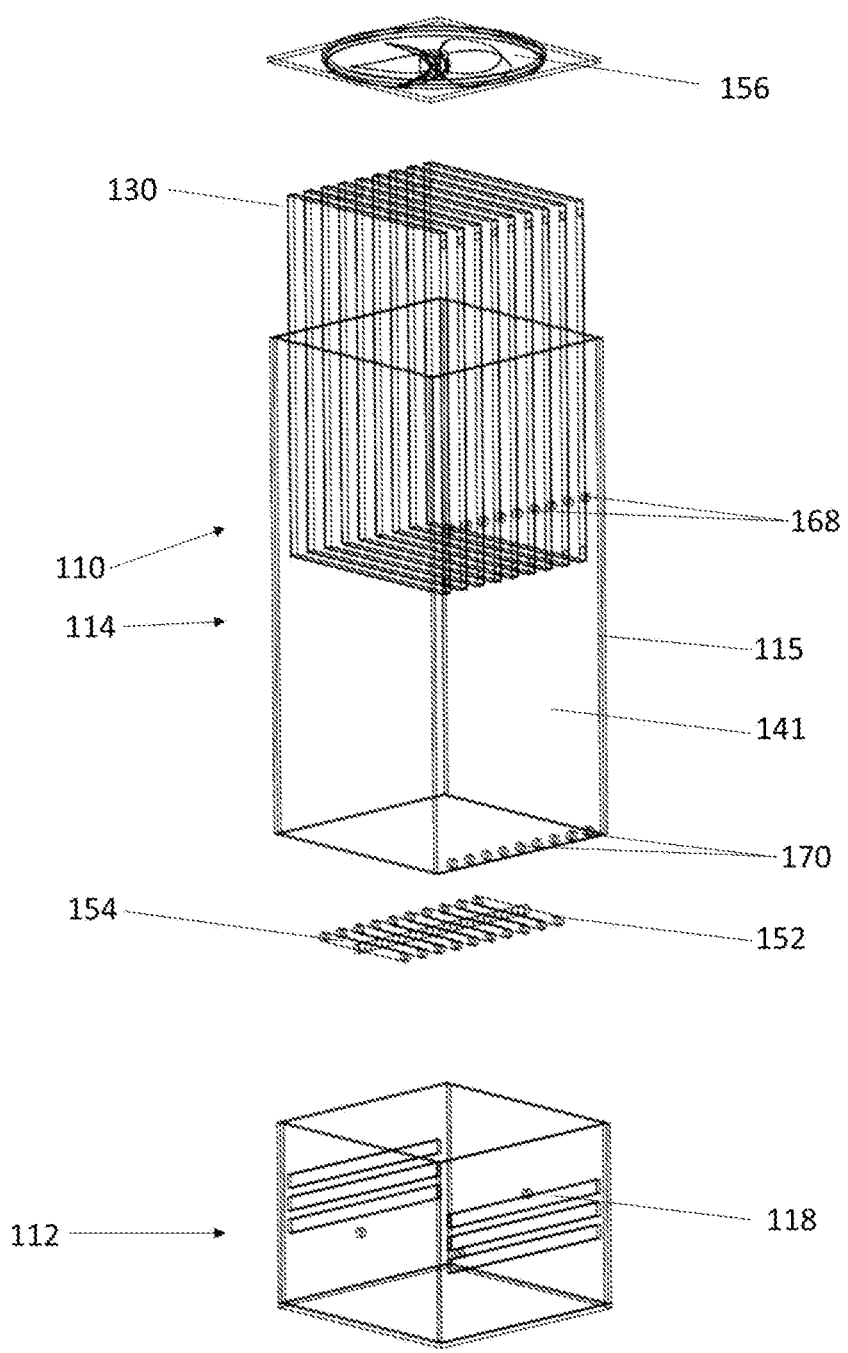
FIG. 6 is a top perspective exploded view of an apparatus according to an additional exemplary embodiment of the invention (similar to that of FIG. 5, but with the inlet and outlet in a different location than shown in FIG. 5)
Figure 7:
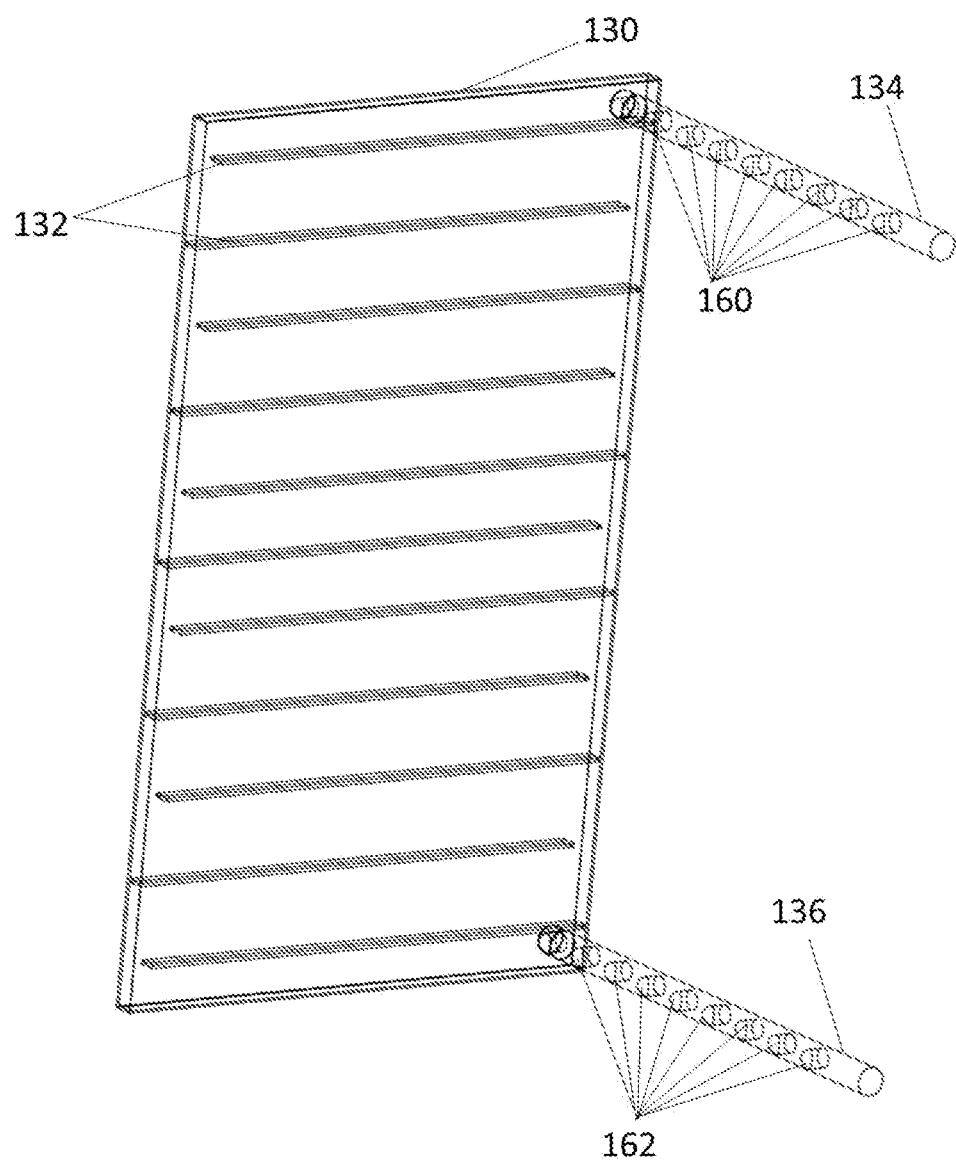
FIG. 7 is a detailed cut away view of a sub-chamber as shown in FIGS. 5 and 6, but with the inlet and outlet in a different location than is shown in FIGS. 5 and 6.

FIG. 5, FIG. 6, and FIG. 7 show another exemplary embodiment of a cooling apparatus in accordance with an embodiment of the invention, with slight variations between each of these three figures as to how the hot liquid is introduced, as will be discussed below. Apparatus 110 is similar to apparatus 10 and operates similarly, but rather than being cylindrical in shape, it is of a box shape, with a square cross-section along the xy-plane (the horizontal direction) and a rectangular cross-section along the xz- or yz-plane (the vertical direction). There is a lower portion 112 with slits 118 therein, and a set of misters 152 supported in bars 154, the misters being fed by a water source (not shown).

As shown in FIG. 5, the misters 152 are at approximately the same height as the slits 118, although, as in apparatus 10, misters 152 could be located at a height above the height of the slits 118 or below the height of the slits 118. There is also a fan 156 in the top-most portion 116, which fan when operating creates an upward draft, pulling air through the slits 118 and past the bars 154 with misters 152. Fan 156 is spaced from the top ends of plates 130 (discussed below), similar to the spacing of fan 56 from the tops of tubes 130 in apparatus 10.

In contrast to apparatus 10, however, the central portion 114 of apparatus 110, which is surrounded by an enclosure 115 having sidewalls 141, contains a series of hollow, rectangular plates 130, which are arranged with the faces of largest area parallel to each other and the plates being in fluid connection with each other. Plates 130 are made of a metal, e.g. a non-corrosive metal having heat conductivity over 100 watt/meter kelvin. Examples of metals with suitable heat conductivity include (but are not limited to) copper (>400 w/m k) and aluminum (>200 w/m k). It is also possible to use stainless steel (>10 w/m k) in some cases. The liquid to be cooled enters the plates via top inlet tube 134. The liquid then travels downward through the plates and exits via outlet tube 136. As is shown in FIG. 7, which depicts a single plate 130 from among the plurality of plates, but with the inlet and outlet tubes 134 and 136 running closer to the edge rather than through the center of the plate 130. In the depicted embodiment, a series of baffles 132 is arranged within one or more of plates 130 to increase the flow path through the plate and thus increase the residence time of the liquid within the plate, thus increasing contact time between the liquid and the sides of plate 130. As shown, baffles 132 are approximately perpendicular to the direction from the misters to fan 156, and run, in alternation from one side of the plate to close to the other side of the plate, thus creating a serpentine flow path through the plate 130, although other arrangements are possible. Also visible in FIG. 7 are a series of ports 160 in inlet tube 134 and a series of ports in 162 in outlet tube 136. Each port is fluid communication with the interior of a plate 130 to allow for inflow and outflow of the liquid to be cooled. In the arrangement of FIG. 6, that fluid communication is via short tubular segments 164 and 166, which pass through holes 168 and 170 formed in one of sidewalls 141. In the configurations shown in FIG. 7 and FIG. 5, in which the inlet and outlet tubes run through the plates themselves, either near the centers of the plates as shown in FIG. 5 or near the sides of the plates as shown in FIG. 6, the ports 160 and 162 open directly into the interiors of the plates in some embodiments.

As shown in FIG. 5, the openings of inlet tube 134 and outlet tube 136 are on the same face of the apparatus, but those openings could also be arranged on different faces, for example on opposite faces. Mist formed by the misters 152 then travels upward through the spaces between the plates and the spaces between the plates and the sidewalls 141 of central portion 114. According to various exemplary embodiments of the invention plates 130 have varying dimensions. For example, in the embodiment shown in FIGS. 5 and 7, the plates have length 60 cm, width 26 cm and thickness of 2 cm, with a distance of 2 cm between adjacent plates and between the plates and the edge.

In the depicted embodiment, misters 152 create a mist, which is dispersed in the air pulled through the spaces between and around plates 130. In the arrangement in which the misters are positioned a distance from the plates, partial evaporation of this mist as it rises prior to entering the central portion 114 helps cool the air prior to entry into the spaces between and around the plates 130. Evaporation of the mist as it rises around the plates 130 further cools the air. Thus the air around the plates 130 will generally be cooler than air entering the slots 118, and upon entry into the spaces between and around the plates 130 will be cooler than the hot liquid passing through the plates. Additionally, water in the mist will also coat the outer surfaces of plates 130 with which the mist comes into contact. As heat transfers from the hot liquid through the bodies of the plates to the outer surfaces of the plates, the water on the outer plate surfaces absorbs the heat and evaporates, being carried up in the stream of air running between and around the plates.

As noted above, in the embodiment shown in FIGS. 7, 6 and 5, the plates 130 are optionally formed with internal baffles (as depicted in FIG. 7). These internal baffles 132 increase the length of the path through which the liquid to be cooled flows and/or increasing residence time of the liquid to be cooled in central portion 114 and/or improve contact between the liquid to be cooled and the sides of the plates 130.

It will also be appreciated that alternative arrangements are possible. For example, the apparatus could be arranged so that the liquid to be cooled runs through a series of pipes, and the mist is formed outside these pipes, so that the air/water mixture is drawn upward along the exterior of the pipes through which the liquid to be cooled runs.

According to various exemplary embodiments of the invention tap water and/or deionized water and/or distilled water are used to feed the misters.

In some exemplary embodiments of the invention, the liquid to be cooled enters the chamber at a temperature in the range of 20° C. to 90° C., for example in the range of 35° C. to 60° C. Depending on the particular apparatus configuration used, the misting rate, the temperature of the water upon misting, the mist droplet size, and the ambient air temperature, the liquid flowing through the conduit is cooled by as much as 20° C. before exiting the chamber through the outlet. Additionally, the ambient air temperature is, in some embodiments, as high 40° C.

Exemplary Apparatus

Referring again to the figures, an apparatus according to various exemplary embodiments of the invention includes a liquid conduit (e.g. central portion 14 in FIG. 1; or plates 130 in FIG. 5) with sealable connectors (e.g. 34 and 36 in FIG. 1 or 134 and 136 in FIG. 5) at opposite ends thereof and air conduits (e.g. 30 in FIG. 1 or spaces between plates 130 in FIG. 5) passing vertically therethrough. In the depicted embodiments, the apparatus includes one or more mist generators (e.g. 52 in FIG. 1 or 152 in FIG. 5) positioned to deliver mist to the air conduits and an airflow generator (e.g. fan 56 in FIG. 1 or 156 in FIG. 5) positioned and configured to move the mist through the air conduits.

In the depicted embodiments, the apparatus includes baffles (e.g. 32 FIG. 1 or 132 in FIG. 7) in the liquid conduit. In some embodiments, the baffles contribute to an increase in residence time of liquid flowing through the liquid conduit. In some embodiments, an increase in residence time contributes to an increase in heat exchange. In some embodiments, the liquid conduit comprises a plurality of compartments (e.g. 130 in FIG. 5) in fluid communication with one another and spaces between compartments 130 serve as the air conduits. In other exemplary embodiments of the invention, the liquid conduit comprises a single compartment (e.g. central portion 14 in FIG. 1) and tubes 30 traversing the compartment serve as the air conduits. According to various exemplary embodiments of the invention an apparatus as described above is deployed in lieu of a conventional condenser in a water chiller system and/or in an air conditioning system or connected to a power plant turbine.

In some exemplary embodiments of the invention, the apparatus has a cooling water requirement of ≤5 L/kW of removed heat energy. Alternatively or additionally, in some embodiments the apparatus has a cooling water requirement of ≥2 L/kW of removed heat energy.

Exemplary Method

Some exemplary embodiments of the invention relate to a method including directing a flow of heated liquid through a conduit with a wall (e.g. central portion 14 in FIG. 1; or plates 130 in FIG. 5) and contacting an airflow carrying mist droplets with the wall (e.g. inner surfaces of tubes 30 in FIG. 1 or surfaces of plates 130 in FIG. 5). In some embodiments, heat from liquid flowing through the conduit heats the wall and that heat evaporates water from a thin film formed by mist droplets settling on the wall, thereby cooling the liquid flowing through the conduit. The principle of effective cooling in the system is establishing a stable thin film (10-100 micron) of water at the air/droplet side (i.e. inner surface of tubes 30 or outer surface of plates 130). The mist is used to replenish this film. If there are not enough mist droplets in the air flow, the film will break and heat conductivity will go down dramatically. As depicted in the figures, the flow of heated liquid and the airflow carrying mist droplets comprise counter-current flows and/or cross-current flows. According to various exemplary embodiments of the invention the mist droplets have a size range of 10 μm to 100 μm diameter or the mist droplets have a size range of 40 μm to 60 μm diameter. Alternatively or additionally, in some embodiments a population of the mist droplets carried by the airflow has an average size of 50 μm diameter. In some exemplary embodiments of the invention, a volume of the mist droplets carried by the airflow is in the range 1 L/min to 4 L/min. The volume of the mist droplets carried by the airflow will vary with the amount of heat that is rejected from the liquid inside the system, around 2 to liters/kw heat rejection. Alternatively or additionally, in some embodiments the method has a cooling water requirement of ≤5 L/kW of removed heat energy. Cooling water here refers to the mist provided in the airflow.

Additional Exemplary Apparatus

In some exemplary embodiments of the invention there is provided a heat exchanger characterized by: a heat transfer coefficient of 500 w/m$^{2\ k}$ to 1000 w/m$^{2\ k}$ and a cooling water (i.e. mist) requirement of ≤5.0 L/kW of removed heat energy. According to various exemplary embodiments of the invention the cooling water requirement is ≤4.5 L/kW of removed heat energy; ≤4.0 L/kW of removed heat energy; ≤3.5 L/kW of removed heat energy; ≤3.0 L/kW of removed heat energy; ≤2.5 L/kW of removed heat energy; ≤2.0 L/kW of removed heat energy or intermediate or lower L/kW of removed heat energy. In some exemplary embodiments of the invention, the heat exchanger is further characterized by a logarithmic mean temperature difference (LMTD) (k) of about 5.

It is expected that during the life of this patent many new mister types will be developed and the scope of the invention is intended to include all such new technologies a priori.

As used herein the term "about" refers to ±10%.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

Specifically, a variety of numerical indicators have been utilized. It should be understood that these numerical indicators could vary even further based upon a variety of engineering principles, materials, intended use and designs incorporated into the various embodiments of the invention. Additionally, components and/or actions ascribed to exemplary embodiments of the invention and depicted as a single unit may be divided into subunits. Conversely, components and/or actions ascribed to exemplary embodiments of the invention and depicted as sub-units/individual actions may be combined into a single unit/action with the described/depicted function.

Alternatively, or additionally, features used to describe a method can be used to characterize an apparatus and features used to describe an apparatus can be used to characterize a method.

It should be further understood that the individual features described hereinabove can be combined in all possible combinations and sub-combinations to produce additional embodiments of the invention. The examples given above are exemplary in nature and are not intended to limit the scope of the invention which is defined solely by the following claims.

Each recitation of an embodiment of the invention that includes a specific feature, part, component, module or process is an explicit statement that additional embodiments of the invention not including the recited feature, part, component, module or process exist.

Alternatively or additionally, various exemplary embodiments of the invention exclude any specific feature, part, component, module, process or element which is not specifically disclosed herein.

Specifically, the invention has been described in the context of apparatus and methods to cool water but might also be used to cool other liquids.

All publications, references, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The terms "include", and "have" and their conjugates as used herein mean "including but not necessarily limited to".

The invention claimed is:

1. An apparatus comprising:
   a central conduit comprising one of: a plurality of tubes, and a plurality of plates, wherein each one of the plurality of tubes or the plurality of plates has a first surface that comes in contact with a flowing liquid and a second opposite surface that comes in contact with air comprising droplets;
   an airflow generator positioned at a first upper end of said central conduit, and configured to produce an air flow and introduce said air flow to said second surface; and
   one or more misters positioned at a second bottom end of said central conduit, and configured to deliver mist to said air flow, thereby a mixture of said mist and said air flow forms a thin water-film that is dynamically being drawn upward along said second surface.

2. The apparatus of claim 1, wherein the air flow is produced at Reynolds number larger than 10000.

3. The apparatus of claim 1, wherein the thin water-film is between 10 to 100 microns thick.

4. The apparatus of claim 1, wherein the one or more misters are configured to produce between 0.05 to 4 liter of flowing liquid mist per minute.

5. The apparatus of claim 1, wherein the one or more misters are configured to produce droplets of flowing liquid in a size range of 10 μm to 100 μm.

6. The apparatus of claim 1, wherein the first surface is an inner surface of each tube from the plurality of tubes, and wherein the misters and air flow generator are configured to deliver the mist into the inner surface of each tube.

7. The apparatus of claim 1, wherein the first surface is an outer surface of each plate from the plurality of plates and wherein the misters and air flow generator are configured to deliver the mist onto the outer surface of each plate.

8. The apparatus of claim 1, further comprising a hot liquid inlet tube for introducing hot liquid into the central conduit.

9. The apparatus of claim 1, wherein the central conduit comprises the plurality of tubes and wherein the apparatus further comprises a plurality of baffles arranged in alternation on an inner surface of the central conduit.

10. The apparatus of claim 1, further comprising two disks for sealing the central conduit.

11. A method of cooling a hot liquid, comprising:
    introducing hot liquid into a central conduit of a cooling device, via an inlet, wherein the central conduit comprises one of: a plurality of tubes and a plurality of plates, wherein each one of the plurality of tubes or the a plurality of plates has a first surface that comes in contact with a flowing liquid and a second opposite surface that comes in contact with an air comprising droplets;
    producing an airflow and introducing said air flow to said second surface;
    producing and delivering mist to said air flow, thereby forming a thin water-film on said second surface, that is dynamically being drawn upward along said second surface.

12. The method of claim 11, wherein the air flow is produced at Reynolds number larger than 10000.

13. The method of claim 11, wherein the thin water-film is between 10 to 100 microns thick.

14. The method of claim 11, wherein the mist is produced at a capacity of between 0.05 to 4 liter of flowing liquid mist per minute.

15. The method of claim 11, wherein the mist has droplets of flowing liquid in a size range of 10 μm to 100 μm.

* * * * *